US008326965B2

(12) United States Patent
Grumann et al.

(10) Patent No.: US 8,326,965 B2
(45) Date of Patent: Dec. 4, 2012

(54) METHOD AND APPARATUS TO EXTRACT THE HEALTH OF A SERVICE FROM A HOST MACHINE

(75) Inventors: Doug Grumann, Citrus Heights, CA (US); Steven R. Landherr, Dallas, TX (US); Thomas E. Turicchi, Jr., Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2263 days.

(21) Appl. No.: 09/848,713

(22) Filed: May 3, 2001

(65) Prior Publication Data

US 2002/0165892 A1 Nov. 7, 2002

(51) Int. Cl.
*G06F 15/173* (2006.01)
(52) U.S. Cl. .......................................... 709/224
(58) Field of Classification Search .............. 702/182, 702/186; 709/224; 707/203, 10, 7; 370/241
See application file for complete search history.

(56) References Cited

U.S. PATENT DOCUMENTS

| | | | | |
|---|---|---|---|---|
| 5,062,055 | A | | 10/1991 | Chinnaswamy et al. ......... 15/18 |
| 5,379,406 | A | | 1/1995 | Wade ................................ 11/34 |
| 5,819,028 | A | * | 10/1998 | Manghirmalani et al. ...... 714/57 |
| 5,949,976 | A | * | 9/1999 | Chappelle ..................... 709/224 |
| 6,044,335 | A | | 3/2000 | Ksendzov ......................... 15/20 |
| 6,128,628 | A | | 10/2000 | Waclawski et al. .............. 17/30 |
| 6,182,022 | B1 | | 1/2001 | Mayle et al. ...................... 11/30 |
| 6,377,988 | B1 | * | 4/2002 | Spector et al. ................ 709/224 |
| 6,446,123 | B1 | * | 9/2002 | Ballantine et al. ............ 709/224 |
| 6,456,306 | B1 | * | 9/2002 | Chin et al. ..................... 715/810 |
| 6,633,908 | B1 | * | 10/2003 | Leymann et al. ............. 709/224 |
| 6,647,413 | B1 | * | 11/2003 | Walrand et al. .............. 709/224 |
| 6,738,811 | B1 | * | 5/2004 | Liang ............................. 709/224 |
| 6,778,652 | B2 | * | 8/2004 | Gaus et al. .................. 379/201.01 |
| 6,816,898 | B1 | * | 11/2004 | Garg et al. ..................... 709/224 |
| 6,876,988 | B2 | * | 4/2005 | Helsper et al. .................. 706/21 |
| 6,993,585 | B1 | * | 1/2006 | Starkovich et al. ........... 709/228 |
| 7,020,697 | B1 | * | 3/2006 | Goodman et al. ............. 709/223 |
| 7,320,030 | B2 | * | 1/2008 | Brown .......................... 709/224 |
| 7,356,579 | B1 | * | 4/2008 | Motoyama et al. ........... 709/224 |
| 7,356,583 | B2 | * | 4/2008 | Palmer et al. ................. 709/224 |
| 7,656,810 | B2 | * | 2/2010 | Horton et al. .................. 370/242 |

(Continued)

FOREIGN PATENT DOCUMENTS

EP 0280020 A2 1/1988

(Continued)

OTHER PUBLICATIONS

Open Group Technical Standard: Systems Management: Application Response Measurement (ARM) API, Jul. 1998, The Open Group.*

(Continued)

*Primary Examiner* — Douglas Blair
*Assistant Examiner* — Benjamin Ailes

(57) ABSTRACT

To achieve consistent health service measures, a method and an apparatus combine various metrics from both internal sources and external sources that relate to the service under observation. This service health information is generated independently from specific provider applications and performance monitoring tool sets, thereby allowing shorter time-to-market for service management solutions. The output of the method may be in the form of a programmatic or scriptable interface to be used by high-level performance monitoring tools that are capable of reporting status of many disparate computer services. The performance monitoring tools may reside on different systems and architectures and may be supplied by different vendors. As a result, the programmatic or scriptable interfaces are designed to be generic and flexible.

16 Claims, 6 Drawing Sheets

U.S. PATENT DOCUMENTS

| | | | |
|---|---|---|---|
| 2002/0026505 A1* | 2/2002 | Terry | 709/221 |
| 2002/0049687 A1* | 4/2002 | Helsper et al. | 706/45 |
| 2002/0099818 A1* | 7/2002 | Russell et al. | 709/224 |
| 2002/0133584 A1* | 9/2002 | Greuel et al. | 709/224 |
| 2003/0005152 A1* | 1/2003 | Diwan et al. | 709/239 |
| 2004/0073657 A1* | 4/2004 | Palmer et al. | 709/224 |
| 2005/0066030 A1* | 3/2005 | Barnhouse et al. | 709/224 |

FOREIGN PATENT DOCUMENTS

| | | |
|---|---|---|
| JP | 2000-047902 | 2/2000 |
| JP | 2000-172537 | 6/2000 |
| JP | 2000-293410 | 10/2000 |

OTHER PUBLICATIONS

Horiuchi, et al., "Realization Method for Providing Flexible View of Management Information Base (MIB) in Network Management", KDD R&D Laboratories, vol. 39 No. 2, pp. 367-378, Feb. 1998.

Shigeyuki, et al., "Tivoli", Notes/Domino Magazine, pp. 24-29, Mar. 2000 # 041.

Technical Focus, "Windows Script Host", pp. 122-126, Apr. 2000.

Windows 2000, ASCII Network PRO, pp. 124-127, Jul. 2000.

Gamma, et al., "Decorator", pp. 187-196, Oct. 16, 1995.

* cited by examiner

METHOD AND APPARATUS TO EXTRACT THE HEALTH OF A SERVICE FROM A HOST MACHINE

TECHNICAL FIELD

The technical field is software systems designed to monitor performance of a computer system.

BACKGROUND

Performance of modern computer systems, including networked computer servers, may degrade for a variety of reasons, many of which relate to the use of shared resources including disk bandwidth, memory capacity, and central processing unit (CPU) utilization. Information technology (IT) system administrators track performance of their computer systems to ensure optimum allocation of these and other shared resources. Performance monitoring software provides system administrators with the tools necessary to track system performance and to diagnose problems. The performance monitoring software may provide immediate performance information about a computer system, allow the administrator to examine computer system activities, identify and resolve bottlenecks, and tune the computer system for more efficient operation. The performance monitoring software may keep a history of the computer system performance, monitoring performance as a background task, and may send alarms for impending performance problems. Using the performance monitoring software, the administrator can pinpoint trends in computer system activities, and can use this information to balance workloads to accurately plan for computer system growth.

In order to examine performance, the performance monitoring software must first collect performance information. This performance information, or instrumentation, may be provided by the Operating System, software probes, or applications. Metrics derived from this instrumentation may be organized in several different ways, including by resource, or from a global level down to an application level (groups of processes), then to a process or individual thread level. Metrics derived by performance monitoring software can include CPU and memory utilization, time spent waiting for different system resources, queue lengths, application-specific table and status information, and application response time. These metrics may be used by the administrator to tune the system for optimal performance, and the performance monitoring software may generate alerts and warnings whenever a threshold value is approached or exceeded. The thresholds may be adjustable, and the alerts and warnings may be provided by an e-mail message, for example.

Computer systems provide services to their users and to other services in a computing environment. The goal of tuning is to optimize the services which reside on a particular system. Services (such as a data repository or internet web service) may be composed of one or more specific applications, which are in turn composed of one or more processes instantiated on the computer system. Users of the computer system observe the behavior in terms of the service they access, whereas internally the computer system differentiates performance more in terms of specific resources, processes, and applications.

Unfortunately, current computing services do not have a consistent way to report their status to the tools that monitor performance. Each service, or its constituent applications and processes, may have internal status measures and instrumentation that would be useful to the performance monitoring software. However, there is no consistency in the way in which performance instrumentation is made available or reported. Furthermore, most applications do not generate their own performance information. Finally, services rarely receive "external" information related to the complex computer environment in which they operate. Bottlenecks external to the service itself, such as network bandwidth and dependent service shortfalls, may affect service health and responsiveness, yet the potential external bottlenecks are not monitored and managed in a cohesive way. As a result, the health of a service often cannot be managed, or even characterized and reported. Most often, service status is only characterized as "up" or "down." In evolving complex computer systems, a consistent method is required to analyze service health to a more robust level of detail. Greater granularity of service status would enable construction of useful service goals and management of service level objectives in order to achieve greater consistency of performance and availability.

Yet another problem with service health performance monitoring is that the rules related to data collection and analysis of performance instrumentation are constantly changing. Every time a new version of an application is introduced into an environment, the performance information related to the application may change. Likewise, the performance monitoring software itself can change. These changes may result in new ways to access instrumentation or process it, and introduce new data sources, for example. The system administrator must constantly adapt the way performance monitoring is configured because of the built-in dependency among the different layers of the applications, instrumentation, the performance monitoring software, and the computer operating system environment. Any change in the environment often mandates change in performance monitoring.

SUMMARY

Services and their associated applications and processes that run on current computer systems often do not provide the type of information needed to determine how well the services are performing. Other services provide information, but in a manner that is not consistent from application to application. As a result, administrators of the services often cannot gauge their performance or take actions to prevent performance degradation.

To achieve consistent service health metrics, a method and an apparatus combine various measurements from both internal sources and external sources that relate to the service under observation. This service health information is generated independently from specific provider applications and performance monitoring tool sets, thereby allowing shorter time-to-market for service management solutions.

The output of the method may be in the form of a programmatic or scriptable interface to be used by high-level performance monitoring tools that are capable of reporting status of many disparate computer services. The performance monitoring tools may reside on different systems and architectures and may be supplied by different vendors. As a result, the programmatic or scriptable interfaces to access service health metrics are designed to be generic and flexible.

The apparatus includes a health generator module that determines the health of a service by dynamically gathering and/or deriving information from the service or its constituent applications and processes, and from information related to the system on which the applications execute. The service health metrics generated may include: service availability, service capacity, and the current throughput, for example. The method dynamically derives consistent health metrics for a wide range of services. Input to the health generator encapsulates knowledge of different applications, their instrumentation sources, and how they can be affected by various external factors. The output of the health generator, which may be accessed via programmatic or scriptable interfaces, can be used by the unrelated performance monitoring tool sets.

In producing the consistent service health metrics, the apparatus may use instrumentation provided by applications and processes making up a service, from user input, plug-in instrumentation, and system-level performance information. Where the metrics are not directly available from any source, the apparatus may derive the metrics from a combination of indirect data sources.

The apparatus generates a limited set of metrics to characterize the health of any service. For example, instead of all the different potentially measurable parameters that can be derived from instrumentation associated with an application, fewer than ten specific metrics may be used to comprehensively define service health. In an embodiment, the set of metrics includes availability, capacity, current throughput, current average service time, queue length, overall utilization, service violations, and user satisfaction.

To harvest these metrics from different sources, the apparatus and method may be used to solicit feedback from a customer, to benchmark the service, or to probe the service. Plug in modules, which are essentially monitoring packages specific to an application, may be used to access performance instrumentation specific to an application. However the performance information is gathered, the apparatus and method translate the gathered performance information, or metrics, into health metrics. The result is an abstracted set of consistent service health metrics that can be provided to the performance monitoring tools such that the tools may use these metrics without needing to know how the health metrics were derived. This decouples the performance tool implementation from the metric derivation and removes dependencies between the services, their implementation, and the management tool set. For example, a tool may use the generated service level violation metric to generate an alert when violations raise above a threshold. The performance monitoring tools do not need to know anything about the service, its instrumentation, or how the service level metric is calculated. The tool simply compares the resultant metric against its threshold. The performance monitoring tool uses a programmatic interface library call or script interface to access health metrics for all current services. If the underlying application changes, the current version of the performance monitoring tool is unaffected because of this consistent interface. As a result, the system administrator does not necessarily need to install a new version of the performance monitoring tool. Thus, the apparatus and method are extensible without propagating a dependency up into the higher levels of the management software.

DESCRIPTION OF THE DRAWINGS

The detailed description will refer to the following drawings, in which like numbers refer to like items, and in which.

DETAILED DESCRIPTION

Figure 1:
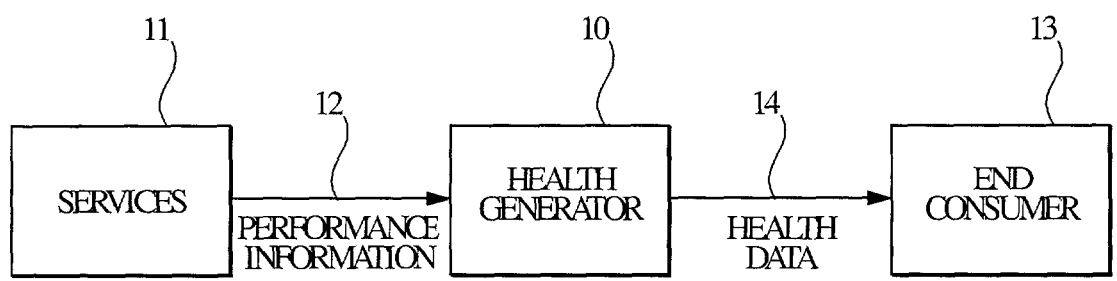
FIG. 1 is a block diagram showing the overall concept for providing the health of a service or application.

Modern computer systems, including networked computers, and the services that are provided by them, are subject to performance degradation for a variety of reasons, many of which relate to the use of shared resources including disk bandwidth, memory capacity, and central processing unit (CPU) utilization. Information technology (IT) system administrators track performance of their computer systems to ensure optimum allocation of these and other shared resources. Performance monitoring software provides system administrators with the tools necessary to track system performance and to diagnose problems. The performance monitoring software may provide immediate performance information about a computer system, allow the administrator to examine computer system activities, identify and resolve bottlenecks, and tune the computer system for more efficient operation. System administrators are interested in tracking performance of their computer systems to ensure optimum allocation of these and other shared resources. Performance management software provides the administrator with the tools necessary to continually track computer system performance and diagnose problems. The performance management software provides immediate performance information about a computer system, allows the administrator to examine computer system activities, identify and resolve bottlenecks, and tune the computer system for more efficient operation.

Each service, which may be composed of various web and database applications, may have internal status instrumentation that may be made available to external monitoring software. While some applications may individually provide measures of their service health, a universal implementation of any one standard instrumentation approach is unlikely to emerge, given the variety of application environments, platforms, and the rapid development pace of new services. Likewise, monitoring tools available in the market cannot adapt to rapid-paced specific changes in the applications they are required to monitor. Furthermore, services are rarely aware of the complex computer environment in which their applications operate. External sources affect services, yet the external sources are not monitored and managed in a cohesive way. As a result, the health of a service often cannot be characterized or reported.

To solve these problems, a method and an apparatus are used to derive consistent service health measures by combining various instrumentation from both internal sources and external sources that relate to the service under observation. The service health metrics may be directly measured or derived from the applications, processes and thread instrumentation, for example. The method is independent of specific provider applications and management tool sets, thereby allowing for shorter time-to-market for service management solutions.

The output of the method may be either in the form of a programmatic or scriptable interface to be used by high-level monitoring tools that are capable of reporting status of many disparate computer services. The tools may reside on different systems and architectures and may be supplied by different vendors. To accommodate different performance monitoring tools, the interfaces are generic and flexible.

FIG. 1 is a block diagram showing the overall concept for providing the health of a service. In FIG. 1, interfaces inherent to threads, processes, and applications that compose services (services) 11 are accessed by a health generator 10, which derives performance information 12 related to the services 11. The performance information 12 may include one or more metrics related to performance. The health generator 10 transforms the performance information 12 into a consistent set of health metrics 14 that can be accessed by an end consumer 13. The end consumer 13 may be a performance monitoring tool set that is intended to monitor the performance of the services 11, and would generate alarms, alerts, or display the health data via a graphical user interface (GUI). The performance monitoring tool set may include one or more specific performance monitoring tools.

Figure 2:
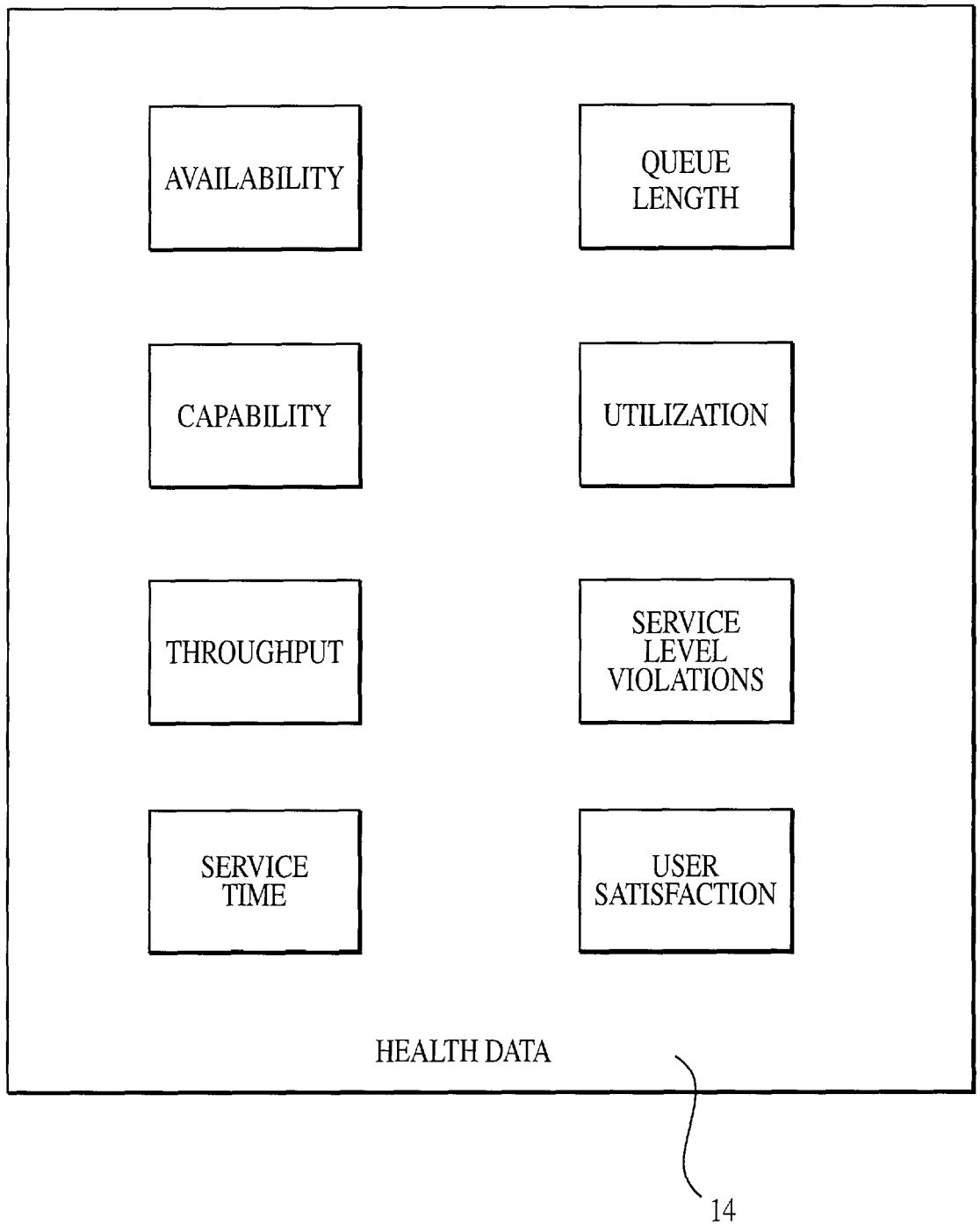
FIG. 2 is a block diagram of performance metrics that measure the health of a service or application.

In the concept illustrated in FIG. 1, the health of a service may be quantified by a discrete set of metrics. For example, eight metrics are derived to totally, or at least sufficiently, define service health. FIG. 2 is a block diagram showing the set of eight metrics that are used to characterize the health of a diverse group of services. The metrics include:

Availability—a binary indication of whether the service is currently operable ("up" or "down").

Capacity—an indication of the maximum throughput of the service at the current time. Capacity can vary over time depending on external factors and internal configuration.

Throughput—the service transaction rate. An indication of how much work is being done by the service at the current time. Typically an average over an appropriate collection interval.

Service Time—the average current clock time per transaction.

Queue Length—the average number of transactions queued waiting for service over the collection interval.

Utilization—a percentage indication of the current throughput of the service as the service relates to the capacity of the service.

Service Level Violations—if a service level objective is stated for a service, the violation count over a measurement interval is the number of transactions that exceed the service time specified. This metric allows for multiple service objective definitions that can be used to distinguish transaction distribution levels (e.g., "slow" and "very slow"). Also note that there may be different Quality Of Service (QOS) objectives for different types of transactions within a service or different end-users of a service. Thus there may be more than one service level, each corresponding to a different QOS category. For example, "platinum" high-priority users may have a more restrictive service level objective than normal lower-priority users.

User Satisfaction—an indicator from the service consumer as to the relative ability of the system to provide the required service. This metric is an extension of availability, and provides a common scale by which to judge performance of a service from the user's perspective. In an embodiment, user satisfaction may be measured by submitting a questionnaire to users of the computer system, and recording the customer's responses. For example, a web service could include an interactive window on the service's web page that queries every $100^{th}$ user who accesses the web page as to how "happy" the user is with the service responsiveness. The user may be asked to select from a list of responses, such as "Great" "OK" and "Too Slow" The collected responses are a metric useful for determining user satisfaction, though they may also need to be scaled according to Quality Of Service category.

The metrics shown in FIG. 2 are sufficient, but other metrics may be added to further define details of the health of a service. Use of the metrics 12 will be described later in detail.

Figure 3:
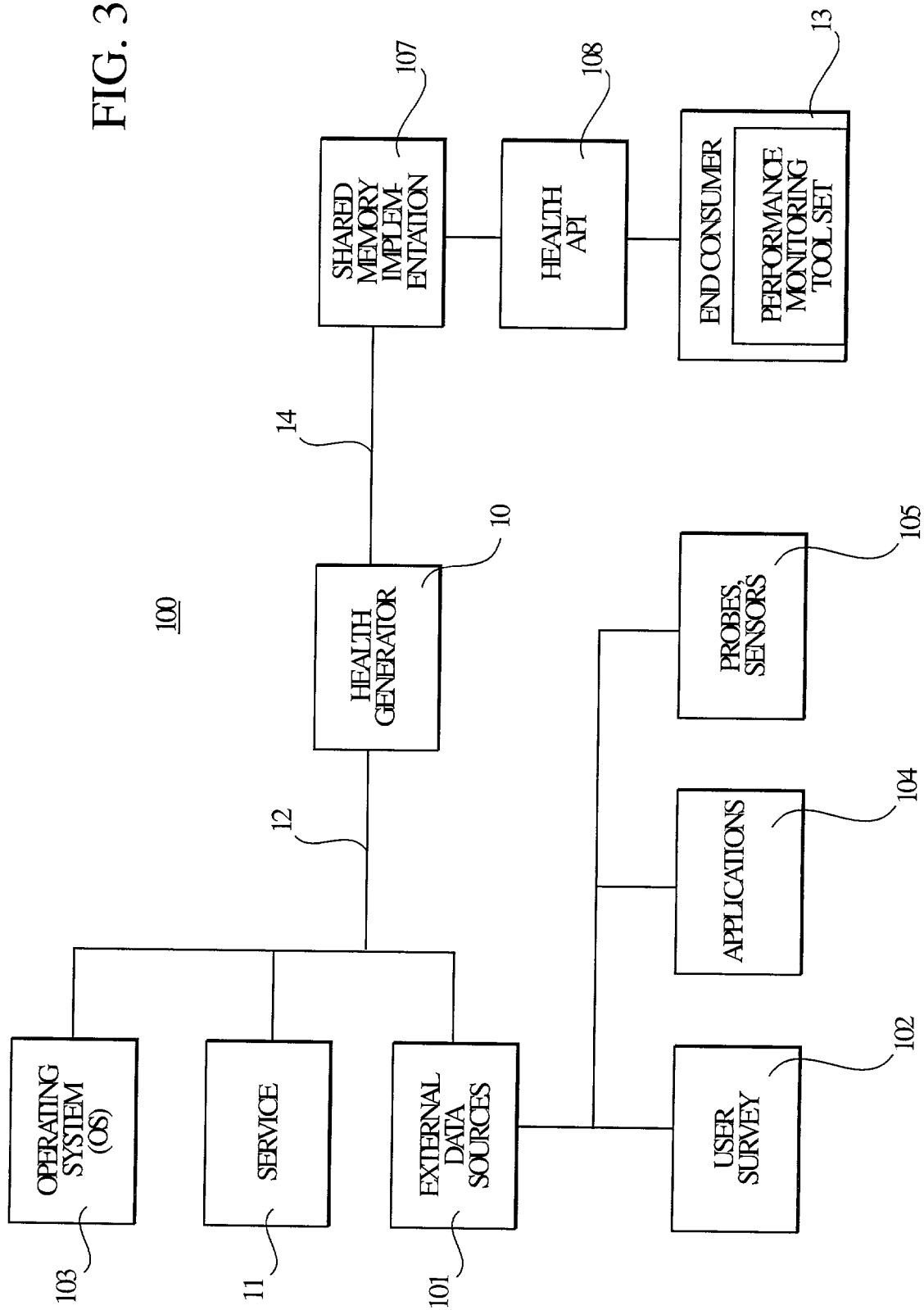
FIG. 3 is an overall block diagram of a system that uses a health generation algorithm to determine the health of a service hosted on the system.

FIG. 3 is an overall block diagram of a system 100 that uses a health generation algorithm to determine the health of a service hosted on the system 100. In FIG. 3, instrumentation sources within the applications which instantiate services 11 is accessed to generate the performance information 12 input to the health generator 10. The health generator 10 provides the output health data 14 to the end consumer 13, shown in FIG. 3 as a performance monitoring tool set. Interposed between the end consumer 13 and the health generator 10 is a shared memory implementation 107 and a health application programming interface (API) or a scriptable interface 108. The shared memory implementation 107 provides for data storage accessible via the health API 108, for example.

The shared memory implementation 107 stores the health data 14 so that any performance management tool in the performance monitoring tool set may access the health data 14, and may do so at an interval consistent with the design of the performance monitoring tools set. For example, a first vendor might have a different agent to report performance information than does a second vendor. Both vendor's tools could access the shared memory implementation 107 via a common API library to get the same health data 14 asynchronously and at different time intervals. The shared memory implementation 107, with an API library for access, accommodates the needs of multiple consumers.

The computer system 100 is also shown with an operating system 103 and other external data sources 101. Performance of various subsystems within the operating system 103 may affect and be indicative of the health of any of the services 11. Accordingly, other external data sources 101 may provide performance information to the health generator 10. Other data sources 101 may include metrics from applications 104 unrelated to the specific service 11, or response-time data from independent probes or sensors 105.

Examples of the data sources 101 and 103-105 include techniques and programs that may be used to report performance information. These techniques and programs include a user application response, which is a direct measure of the response of the service from the customer, user, or other service that depends on service. Various instrumentation packages (such as the Application Response Measurement (ARM) industry standard) can be used to provide this data.

Performance information can also be supplied by plug-in instrumentation. Many applications have plug-in modules customized specifically to an application. The plug-in modules are used by the performance monitoring tools to provide status. Examples are monitoring packages available with database packages. These plug-ins vary in their implementation, interfaces, and applicability. A flexible interface allows the use of plug-in instrumentation data as a source to the health generator 10 without requiring changes to the externally-supplied plug-in or underlying application.

Data could also be gathered manually, for example from surveys 102. The data gathered from all sources 11 and 101-104 is used by the health generator 10 to produce the health data 14.

Figure 4:
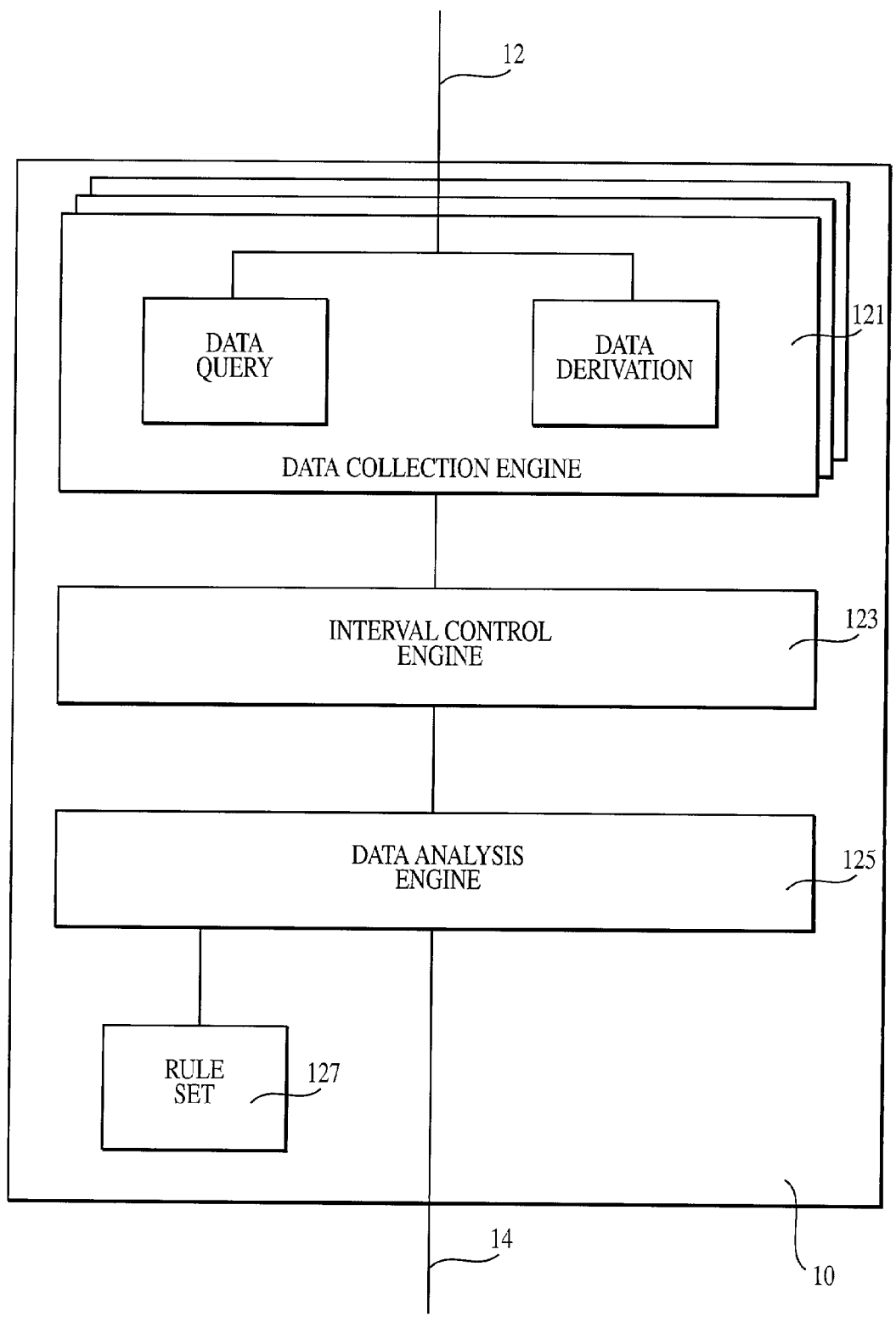
FIG. 4 is a block diagram of an apparatus from FIG. 3 that provides the health of the service.

FIG. 4 is an exemplary block diagram of the health generator 10. A collection of one to many independent data collection engines 121 gather performance information 12 from service instrumentation 11, OS instrumentation 103, and external sources 101. The data collection engines 121 will be described in more detail later. An interval control engine 123 ensures the different data sources are coordinated. The collected information is passed to a data analysis engine 125 which applies a set of rules 127 that control translation of the input data to the published health metrics 14. As an example, a specific response-time data collection engine 121 for Application Response Measurement (ARM) data may be used to influence a specific rule 127 that controls the Service Time health metric 14.

Figure 5:
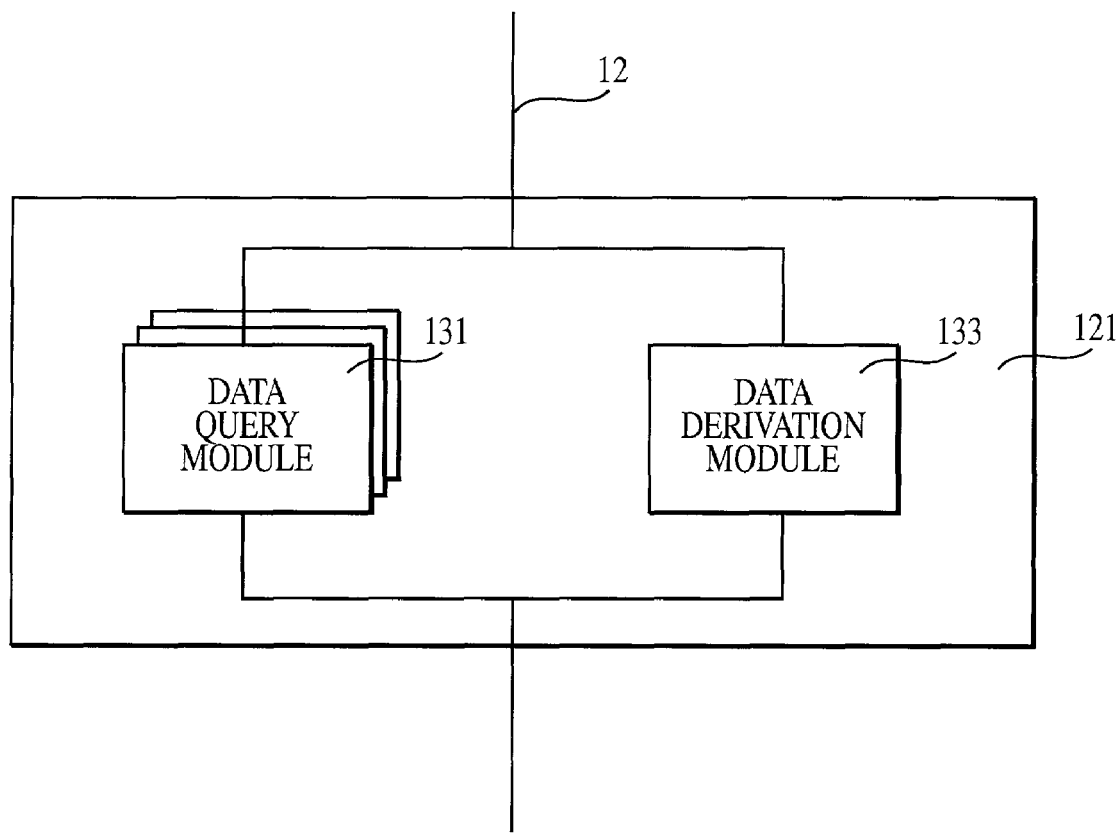
FIG. 5 is a block diagram of a data collection engine used with the apparatus of FIG. 3.

FIG. 5 is a block diagram of the data collection engine 121. Note that the health generator 10 may include many data collection engines 121. Each of the data collection engines 121 may be a separate process or thread, and may be dedicated to collecting data related to different health or performance metrics. Each of the data engines acquire information from a specific data source, and may provide the acquired data to the data analysis engine 125 (by way of the interval control engine 123).

Each of the data collection engines 121 may include one or more input mechanisms and components to collect or derive information from a particular source. The input mechanisms include a data query module 131 and a data derivation module 133. The data query module 131 may be used when a data source provides its own measure of performance. For example, when a service is instrumented to provide performance information such as response time, the health generator 10 may use the performance data, either in its raw form, or perhaps in a modified or summarized format.

When an service is not instrumented to provide performance information, or when the reported performance information is not in a usable format, the data derivation module 133 may be used to extract the desired performance information from the data source. The data derivation module 133 may operate in connection with known methods for extracting information from a service. One such method involves writing a wrapper program to extract the performance information. The wrapper is a software layer inserted between the data collection engine 121 and the service being monitored. Every time a transaction occurs in the service, information may be passed through the wrapper. The wrapper receives the information and passes the information to the data collection engine. For example, a wrapper may be written for a database application. Every time a database call is made, the call goes through the wrapper. Upon transmission of the call, the wrapper records a start time. When the database call is complete, the wrapper records a stop time. The difference between the start and stop times may then be computed and reported as a performance metric, or an input to a performance metric. Other methods for deriving data include use of a benchmark program and use of a probe program, both of which are known in the art.

Returning to FIG. 4, the data analysis engine 125 accesses the data from the data collection engine 121 to relate the collected performance information to the output metrics 14 shown in FIG. 2. In particular, the data analysis engine 125 determines which collected parameters are to be associated with a particular output metric according to a user-modifiable set of rules 127. The data analysis engine 125 may determine that a specific collected metric should be associated with one, or more than one, output metric.

The interval control engine 123 accommodates metrics with different reporting times, or intervals, and different data read requirements of the performance monitoring tools. That is, since the input harvesting and output generation performed by the health generator 10 may need to proceed asynchronously, intervalization control may be required to ensure consistency in the results. For example, some summarization may need to occur to the input data in order to provide the health data 14 to the performance monitoring tool relevant to the time interval the performance monitoring tool expects. As a more specific example, a database application may provide metric data once every 30 seconds. However, a performance monitoring tool may request performance information every five minutes. As a result, the health generator 10 would get 10 samples of data for every one time the performance monitoring tool requests a report of that data. This problem is exacerbated when several different performance monitoring tools are accessing the data. The different performance monitoring tools may all impose different constraints on the output of the health generator 10, so that an asynchronous method may be required to ensure the consistency of the results. As a result, there may be a need to summarize data if the data is being processed by the analysis engine several times during one interval, for example.

The rules set 127 provides algorithms and rules to translate the metrics supplied by the data collection engine 121 into a generic format that is usable by the performance monitoring tools. Any collected (i.e., instrumentation accessed or derived) information may be translated to conform to one of the eight metrics shown in FIG. 2. If a service uses an instrumented system, the system may be instrumented to report response time. For example, if an ARM agent average response time is collected by the data collection engine 121, the collected information may be translated into the Service Time output metric. If no other rule has applicability to Service Time, then the ARM agent input will have exclusive control over the Service Time metric, and the rules 127 may not perform any translation.

Other rules that may be applied include weighting schemes. For example, service time may be derived from a remote NFS server as the major component of the Service Time metric. The derived service time may be weighted against more direct measures of the Service Time metric, such as ARM data.

Other rules may include averaging, summarizing, adding and subtracting values for specific performance parameters. For example, service health may depend on how busy resources of the Operating System are. If, for example, a system is totally dedicated to one service, then its utilization metric may be composed of the utilization of the OS resources as a whole. When the CPU or a disk I/O path is fully utilized, the service itself is. Thus the utilization service health metric can be derived by the highest value of either CPU or disk I/O utilization. In this case, the data analysis engine 125 would combine CPU utilization and disk utilization into one output metric which is service utilization.

The output of the health generation process is made available using a shared memory implementation 107, accessible via either an API or a scriptable interface, so that different performance management tools can simultaneously interrogate the service health data 14 at their own intervals. By publishing the interface to the data, the consumer of the health data 14 is not dependent on the presence or version of the health algorithms used in the health generator 10. Thus, the monitoring tool set is decoupled from the specific applications being analyzed. A performance management tool using the output of the health generator 10 will not need to be revised based on changes to a specific service. Instead, existing input mechanisms can be configured to collect new data and rules can be added or changed to provide this functionality.

Figure 6:
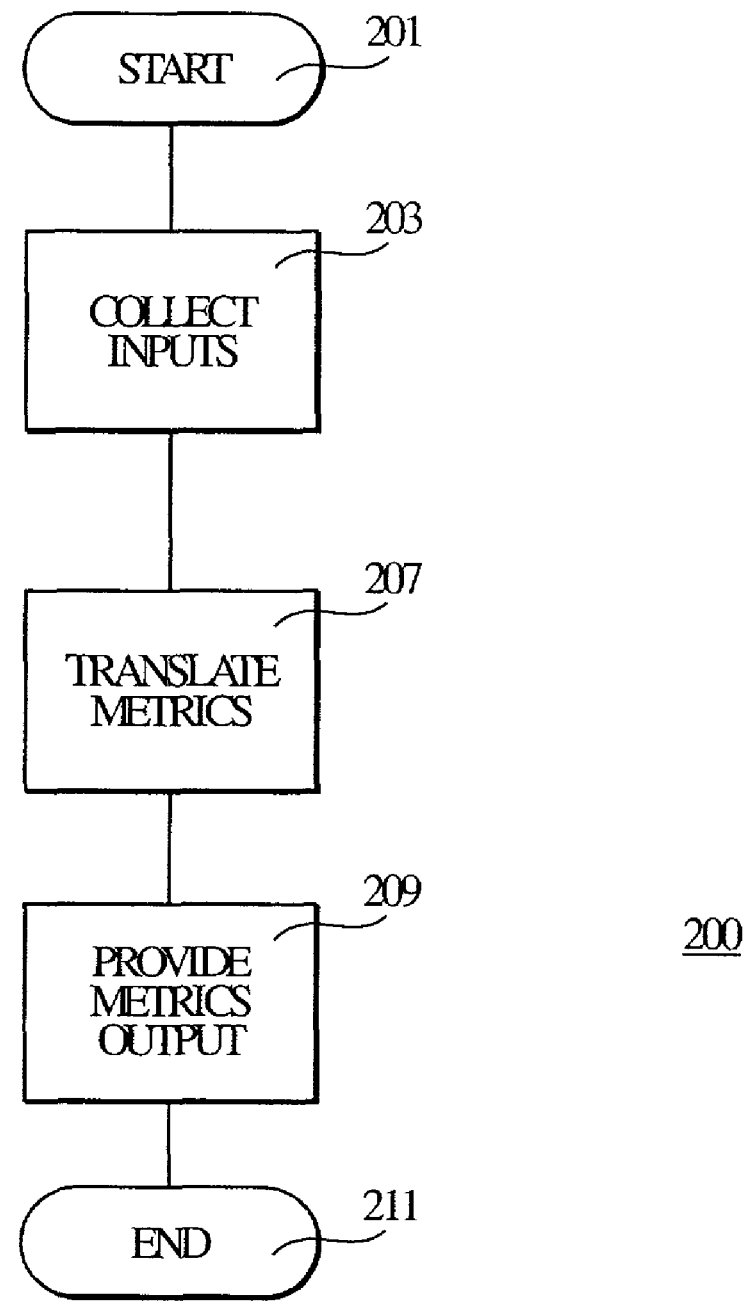
FIG. 6 is a flowchart illustrating a method for extracting the health of the service hosted on the system of FIG. 3.

FIG. 6 is a flowchart illustrating a process 200 for extracting the health of the service hosted on the system of FIG. 3, or on a similar system. The process 200 begins in block 201.

In collect inputs block 203, data collection engines 121 read performance information provided by associated with one or more services hosted on this system. The performance information may include response time, queue length, or other information related to the performance of the service.

The performance information may be provided by instrumentation supplied with the service, or derived externally.

In metric translation block 207, the collected performance information is analyzed and appropriate rules 127 are then applied by the analysis engine 125 to convert the collected information into metrics having a format consistent with the output data scheme used by the health generator 10 to provide the health data 14. In an embodiment, the health data 14 may include the eight metrics shown in FIG. 2. Thus, any collected information may be translated to conform to one of the eight metrics. For example, if an ARM agent average response time filtered by the specific applications making up the service is collected by the data collection engine 121, the collected information may be translated into the Service Time output metric for that service. If no other rule has applicability to Service Time, then the ARM agent input will have exclusive control over the Service Time metric, and the rules 127 may not perform any translation. Other rules that may be applied include weighting schemes to combine input from several different collectors.

Once all metrics for a service are defined, and the corresponding performance information gathered or derived, the resulting health data 14 output is provided to the shared memory implementation 107, block 209. As noted above, the output interface may be an API or a scriptable interface. The method will allow multiple and different performance monitoring tools to simultaneously interrogate the health data 14 at intervals that correspond to the design of the performance monitoring tools. Access to and use of the health data 14 is independent of the method used to collect the health data 14, and the manner in which the health data 14 is stored. In block 211, the process ends.

The invention claimed is:

1. A method for dynamically determining the health of a service resident on a host machine, comprising:
   collecting, by a data collection engine, service performance information from the resident service, wherein the collected service information relates to a plurality of performance metrics; and
   translating, by a health generator, the collected service performance information into a generic output relating to current operational performance of the service, wherein the generic output is one of a scriptable interface and an application programming interface, and useable by different performance monitoring tools;
   wherein the generic output comprises a plurality of service health metrics, and wherein the translating step comprises combining one or more of the plurality of performance metrics to provide one or more of the plurality of service health metrics, and wherein the plurality of service health metrics comprises availability, capacity, throughput, service time, queue length, utilization, service level violations, and user satisfaction.

2. The method of claim 1, wherein the host machine comprises one or more components, further comprising:
   collecting external performance information from one or more of the one or more components;
   translating the collected external performance information; and
   combining the translated external performance information and the translated service performance information to provide the generic output.

3. The method of claim 1, further comprising accessing the generic output to read the health of the service.

4. The method of claim 1, wherein the collecting step comprises reading performance information provided by the service.

5. The method of claim 1, wherein the collecting step comprises deriving performance information from the service.

6. The method of claim 5, wherein the deriving step comprises using a wrapper program to read the performance information.

7. The method of claim 5, wherein the deriving step comprises using a probe program to read the performance information.

8. An apparatus that determines a health of a service resident on a host machine, comprising:
   a data collection engine that collects service health information; and
   a translation data analysis engine that translates the collected service health information using a health generation algorithm and provides a generic output comprising one or more generic health metrics relating to current operational performance of the service, wherein the generic output is one of a scriptable interface and an application programming interface, and useable by different performance monitoring tools, wherein the collected service health information relates to a plurality of performance metrics, wherein the generic output comprises a plurality of service health metrics, and wherein the translation data analysis engine combines one or more of the plurality of performance metrics to provide one or more of the plurality of service health metrics, and wherein the plurality of service health metrics comprises availability, capacity, throughput, service time, queue length, utilization, service level violations, and user satisfaction.

9. The apparatus of claim 8, wherein the host machine comprises one or more external components, wherein the data collection engine collects external performance information from one or more of the one or more external components information, and wherein the translation data analysis engine translates the collected external information using the health generation algorithm to provide the one or more generic health metrics.

10. The apparatus of claim 8, wherein the data collection engine, comprises:
    a data query module that reads performance information from the service; and
    a data derivation module that derives performance information from the service.

11. The apparatus of claim 10, wherein the data derivation module derives the performance information from one or more of a wrapper program, a benchmark program and a probe program.

12. The apparatus of claim 8, wherein the health generation algorithm comprises:
    a weighting scheme that weights one or more performance information parameters;
    a summation scheme that combines one or more performance information parameters; and
    a averaging scheme that averages collected service health information for a service health metric.

13. The apparatus of claim 8, further comprising an interval control engine that receives the service health information at a first time interval and provides an output having a second time interval different from the first time interval.

14. A method for monitoring health data of a service operating on a host machine, comprising:
    collecting service performance information from the service;
    collecting external performance information from components of the host machine;

translating the collected service and external performance information according to a health generation algorithm to generate a generic service health output; and providing the generic service health output relating to current operational performance of the service as an output file accessible by performance monitoring tools, wherein the generic service health output is one of a scriptable interface and an application programming interface, and usable by the different performance monitoring tools, wherein the collected service information relates to a plurality of performance metrics, wherein the generic output comprises a plurality of service health metrics, and wherein the translating step comprises combining one or more of the plurality of performance metrics to provide one or more of the plurality of service health metrics, and wherein the plurality of service health metrics comprises availability, capacity, throughput, service time, queue length, utilization, service level violations, and user satisfaction.

15. The method of claim 14, wherein the step of collecting the service performance information comprises reading first service performance parameters and deriving second service performance parameters, and wherein the step of collecting the external performance information comprises reading first external performance parameters and deriving second external performance parameters.

16. The method of claim 14, further comprising collecting the service performance information on a first time interval and adjusting the first time interval to provide the generic service health output at a second time interval.

* * * * *